United States Patent [19]

Dubot et al.

[11] Patent Number: 4,754,213

[45] Date of Patent: Jun. 28, 1988

[54] SUPPLY CIRCUIT

[75] Inventors: Guy Dubot, Saverne; Pierre L. Simon, Wasselonne, both of France

[73] Assignee: Diehl GmbH & Co., Nurnberg, Fed. Rep. of Germany

[21] Appl. No.: 921,950

[22] Filed: Oct. 21, 1986

[30] Foreign Application Priority Data

Oct. 22, 1985 [DE] Fed. Rep. of Germany ....... 3537447

[51] Int. Cl.⁴ .............................................. H02J 3/12
[52] U.S. Cl. .................................... 323/326; 323/352; 323/908
[58] Field of Search ............... 323/324, 326, 364, 352, 323/293, 908

[56] References Cited

U.S. PATENT DOCUMENTS 3,947,751  3/1976  Bray ................................. 323/908 X

FOREIGN PATENT DOCUMENTS 2408196  8/1975  Fed. Rep. of Germany .
2449922  6/1984  France .

OTHER PUBLICATIONS

H. J. Digneffe, "Inrush Current Reduction Circuit for Thyristor Switched Inductive Loads", Technical Notes, RCA, 9/10/75, pp. 1–5.

*Primary Examiner*—Patrick R. Salce
*Assistant Examiner*—Kristine Peckman
*Attorney, Agent, or Firm*—Scully, Scott, Murphy & Presser

[57] ABSTRACT

A supply circuit for an apparatus which is provided with a supply voltage which is low relative to the amplitude of a main voltage supplied from a main power supply network. The switching apparatus has a switching line arranged in the main power supply line, which is connected in series with a load, and in which the supply circuit is connected in parallel with a power-dissipating or resistance element connected in series with the load.

7 Claims, 1 Drawing Sheet

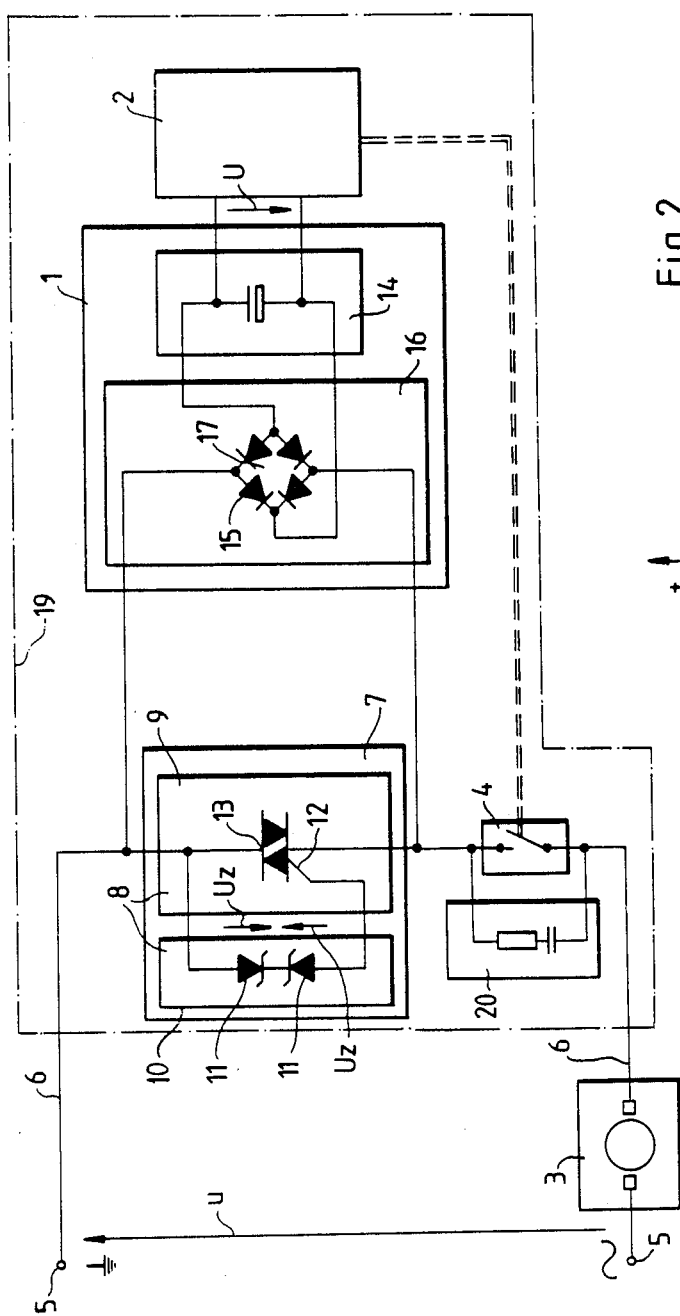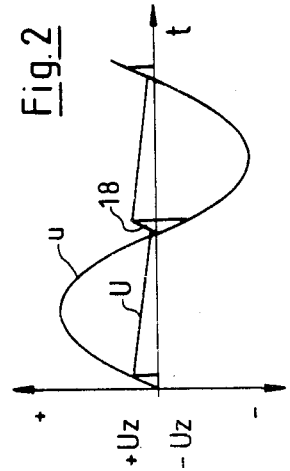

SUPPLY CIRCUIT

BACKGROUND OF THE INVENTION

1. Field of the Invention

The present invention relates to a supply circuit for an apparatus which is provided with a supply voltage which is low relative to the amplitude of a main voltage supplied from a main power supply network. The main power supply line, is connected in series with a load, and the supply circuit is connected in parallel with a power-dissipating or resistance element that is connected in series with the load. The supply circuit supplies voltage to a switching apparatus that controls the switch for connecting and disconnecting the load to the main power supply.

2. Discussion of the Prior Art

A low voltage type of supply circuit is shown in the disclosure of French Pat. No. 2,449,922. In that patent a circuit having an ohmic, resistive power dissipating element is connected in series with the load and the main power supply line. The voltage drop across the ohmic resistance serves as the supply voltage for a constant-current circuit that recharges an accumulator. The accumulator provides the supply voltage for a time-controlled switching apparatus for respectively connecting or disconnecting the main power supply to the load (for example, an electrical heating member or a circulating pump). One special advantage of such a circuit is that the switching apparatus operates from a stored power supply and thus provides continuing operation during the outage of a main power supply voltage. In addition, with a disconnected load, it merely requires a two-wire connection, which is already provided by the switching line that supplies power to the load. Such a circuit eliminates the need for further modification of the main network during installation or operation of the switching apparatus. As a result, even installation in existing systems is enhanced and thus promotes conversion of a simple switching line to energy-saving heating-control systems.

SUMMARY OF THE INVENTION

The present invention, however, is predicated on the recognition that the currently known circuit arrangement has certain disadvantages. In particular, the technological demands on circuitry for recharging the store of power supply is quite considerable. In addition recharging may occur at an inopportune time when operating conditions are unfavorable for effective recharging. Since recharging is dependant upon the momentary power requirement of the load. This is so because the voltage drop across the ohmic resistance or power dissipating element that supply the recharging voltage is determined by the momentary current consumption of the load. Moreover, the operating behavior of the load can be adversely affected by the power-dependent voltage drop if recharging occurs during high power demands of the load.

In view of these conditions encountered in the prior art, it is an object of the present invention to so improve upon a supply circuit of the type under consideration so as to be able to be implemented with only minor technological demands for additional circuitry, and thus at a higher operational dependability, and to concurrently provide a more expedient operational behavior with respect to different loads which are positioned in the current circuit of the main power supply. It is also an object to improve recharging conditions for maintaining a low voltage supply for an auxilary apparatus, especially for a switching apparatus.

The foregoing object is inventively achieved in that the supply circuit of the type described hereinabove incorporates, as the power dissipating or resistance element, a gating circuit which connects the alternating-current main power supply voltage to the load when the main power supply voltage approximately reaches the value of the supply voltage.

In accordance with the foregoing, practically no ohmic resistance losses are encountered any longer in the main power supply and the low voltage supply circuit is independent from the power requirement of the load. The periodic voltage of the main power supply voltage is temporarily suppressed by a small, constant voltage in an amount sufficient for obtaining the supply voltage for the auxilary apparatus and, preferably, especially for the recharging of a running reserve energy storage. This mode of operation, from a circuitry standpoint, is obtained in the simplest manner as a gating control arrangement at such a small gating control angle, that there are no deleterious affects on the operational behavior of a load due to the gating of the small, initial voltage.

The obtaining of the supply voltage for the apparatus and the recharging of the power storage, is thus carried out at a peak voltage which is predetermined by the circuitry. Thus, with the invention one can provide smaller sized components to the supply circuit of the type described for a certain continued bridging operating behavior or bridging over a power outage.

BRIEF DESCRIPTION OF THE DRAWINGS

Additional alternatives and modifications, as well as further features and advantages of the present invention can now be readily ascertained from the following detailed description of a generally schematically illustrated exemplary embodiment of a power supply circuit, taken in conjunction with the accompanying drawings; in which:

FIG. 1 illustrates a circuit block diagram pertaining to the typical utilization of an inventive supply circuit; and FIG. 2 illustrates a voltage-time plot for elucidating the mode of operation of the power supply circuit of FIG. 1.

DETAILED DESCRIPTION

The supply circuit 1 outlined in FIG. 1 of the drawings serves for controlling the supply of power (generally time-dependently controlled or controlled in dependence upon environmental conditions, such as temperature) to a switching apparatus 2 with a pulsating DC-supply voltage U, whose level is a fraction of the amplitude of the main power supply voltage u, which has a load 3 connected thereto. For instance, this load 3 may relate to the injection system of an oil burner, or the circulating pump of a hot-water heating system. This load 3, in the embodiment illustrated in FIG. 1, can be switched on and switched off through the intermediary of a switching line or section 4, which is actuatable by the switching apparatus 2; for example, through the function of a thermostat, a timer or a clock-controlled thermostat.

Connected in series with the connector terminals of the main power line and the load 3, as well as with the switching line 4 of the latter, a power control element 7 is arranged in the main power line 6, which has the supply circuit 1 connected in parallel therewith. However, the power control element 7 is not merely a simple resistor or impedance at which a voltage will drop off pursuant to the extent of the momentary power requirement of the load 3 which is connected to the main power supply 5 through the switching line 4, with the consequence that the supply voltage U for the apparatus 2 would fluctuate in dependence upon the load conditions in the main power line 6; instead thereof, provided as the power control element 7 is a gating circuit 8 which responds to a small fraction of the amplitude of the main power alternating-current voltage u, and which, in the illustrated example, is simply constituted of a bidirectionally functioning thyristor circuit; for example, a triac 9. The circuit is not connected through in accordance with the measure of the load current in the main power line 6, but pursuant to the measure of the periodically fluctuating main voltage u. Provided, for this purpose, is a control signal transmitter 10, whose function is based, for example, on the voltage-dependent actuating or through-connecting characteristics of at least one zener diode 11, which triggers the triac 9 through actuation of its control electrode 12, as soon as the specific zener voltage Uz is exceeded by the time-dependent cycle of the main power voltage u. When the triac 9 is to be triggered during each of the two oppositely-poled half-periods of the main power voltage u, (as indicated in the drawing) two zener diodes 11 are to be oppositely connected in series between the anode 13 and the control electrode 12 of the triac 9.

At the beginning of every half-period of the main power voltage u, there builds up a voltage pursuant to the cycle of the main power control voltage u across the power element 7, until the control signal transmitter 10 responds and switches the triac 9 into a low-ohmic condition, whereby the voltage drop across this power control element 7 breaks down; as is illustrated in FIG. 2 by the voltage-time plot.

In order that the supply voltage U for the apparatus 2 does not pulsate excessively, between the power control element 7 for the tap-off of the supply voltage U and the apparatus 2 which is to be supplied therewith, there is arranged an electrical charging capacitor 14 (for example, in the form of an electrochemical accumulator or a capacitor), which is charged by small voltage peaks Uz periodically occurring across the power dissipating or resistance element 7 and, in accordance with the measure of the load through the apparatus 2, is again slowly discharged (refer to the time-cycle for the supply voltage U in FIG. 2). Consequently, by means of a feedback-blocking diode 15 there is ensured that the charging capacitor 14 cannot discharge itself across the power control element 7, whose triac is connected through during the major portion of a half-period; in effect, is low ohmic. In order that, during the operation of the triac 9 within both half-periods, there can be utilized for the recharging of the accumulator 14 the positive and also the negative voltage peaks Uz, which presently occur at opposite series connection of two zener diodes 11 at the beginning of a half-period, a supply circuit 16 is provided in the illustrated exemplary embodiment, wherein, instead of a single blocking diode 15, there is provided a complete Graetz of full-wave bridge circuit 17, as indicated in FIG. 2 by the positive middle recharging pulse 18.

The voltage drop across the power control element 7 is thereby not dependent upon the load conditions in the main power line 6 but is merely dependent upon the response voltage Uz of the control signal transmitter 10 for the connecting through of the triac 9. That voltage drop, can be quantitatively predetermined by suitable selection of the type of the zener diodes 11.

In operation, the main power supply voltage is connected to the load 3 by the switching line 4. The latter may be, for example, a thermostat or a time switch of the apparatus 2. In any case, the switching system 19 requires the connection of the two main power lines 6. The switching system 19 is equipped with the power control element 7 and the supply circuit 1 ahead of the apparatus 2. There is no need for the installation of additional lines for the operation of the apparatus 2 or, in essence, for the supply of an operating reserve upon a main power outage. The capacity of storage element 14 is sized accordingly. So, when the apparatus 2 (or other means) opens the switching line 4, and thereby interrupts the main power line 6 or, for example, during a temporary outage of the main power voltage u, the time or temperature controlled functions of apparatus 2 are maintained by the reserve the power provided by the power storage element 14. In order to keep the dimensions of power storage element 14 small, switching line 4 is provided with a shunt, high-ohmic RC-series circuit 20. In case power control element 7 fails, an extremely weak induction current will flow through circuit 20 and into the supply circuit. Thus, there is always insured that there is available to the apparatus 2 the necessary supply voltage U for the continuing of its operation.

Thus, a gating control 9 is provided in series with the main power network 5 and is disposed ahead of the switch line 4 and the load 3. The gating control 9 controls the flow of current to the load 3. A supply circuit 1 is connected in parallel with the gating control 9. The threshold voltage $U_z$ for the gating control 9 is low in comparison with the amplitude of the main network voltage u, and $U_z$ is negligible compared to the operating voltage at the rated output of load 3. Due to the low-pass characteristic of a load 3, as a rule, extremely low currents are normally shunted or otherwise cannot influence the load 3.

What is claimed is:

1. A low voltage power supply for use in conjunction with a main supply network having a main power supply for providing a main voltage output variable between a maximum and a minimum voltage, a switch, and a load, all connected in series, the low voltage power supply circuit comprising a gating circuit connected in series with the main power supply voltage output, said gating circuit being adapted to connect the main power supply to the switch when the voltage of the main power supply exceeds a predetermined threshold voltage, said threshold voltage being substantially lower than the maximum value of said main power supply voltage, and for connecting the main power supply to an auxilary power supply circuit when the voltage of the main power supply is below said threshold voltage, said auxilary power supply circuit being connected in parallel with said gating circuit whereby the voltage provided by the gating circuit to the auxilary power supply circuit is independent from the voltage applied by the main supply network to the load.

2. The invention as claimed in claim 1 wherein the gating circuit includes a triac and a voltage-controlled control signal transmitter.

3. The invention as claimed in claim 1 wherein the control signal transmitter comprises a zener diode.

4. The invention as claimed in claim 1 wherein the low voltage power supply circuit includes a charging accumulator and a feed-back blocking diode for preventing discharge of the accumulator into the gating circuit.

5. The invention as claimed in claim 4 wherein the feed-back blocking diode comprises a full-wave bridge connected between the accumulator and the gating circuit.

6. The invention as claimed in claim 2 wherein the control signal transmitter comprises two oppositely disposed series connected zener diodes.

7. The invention as claimed in claim 1 wherein a high-ohmic RC-series circuit is disposed across the switch and in series with the gating circuit.

* * * * *